Feb. 24, 1948. W. M. DAVIS 2,436,766
METHOD OF MAKING PELLETS
Filed July 19, 1943
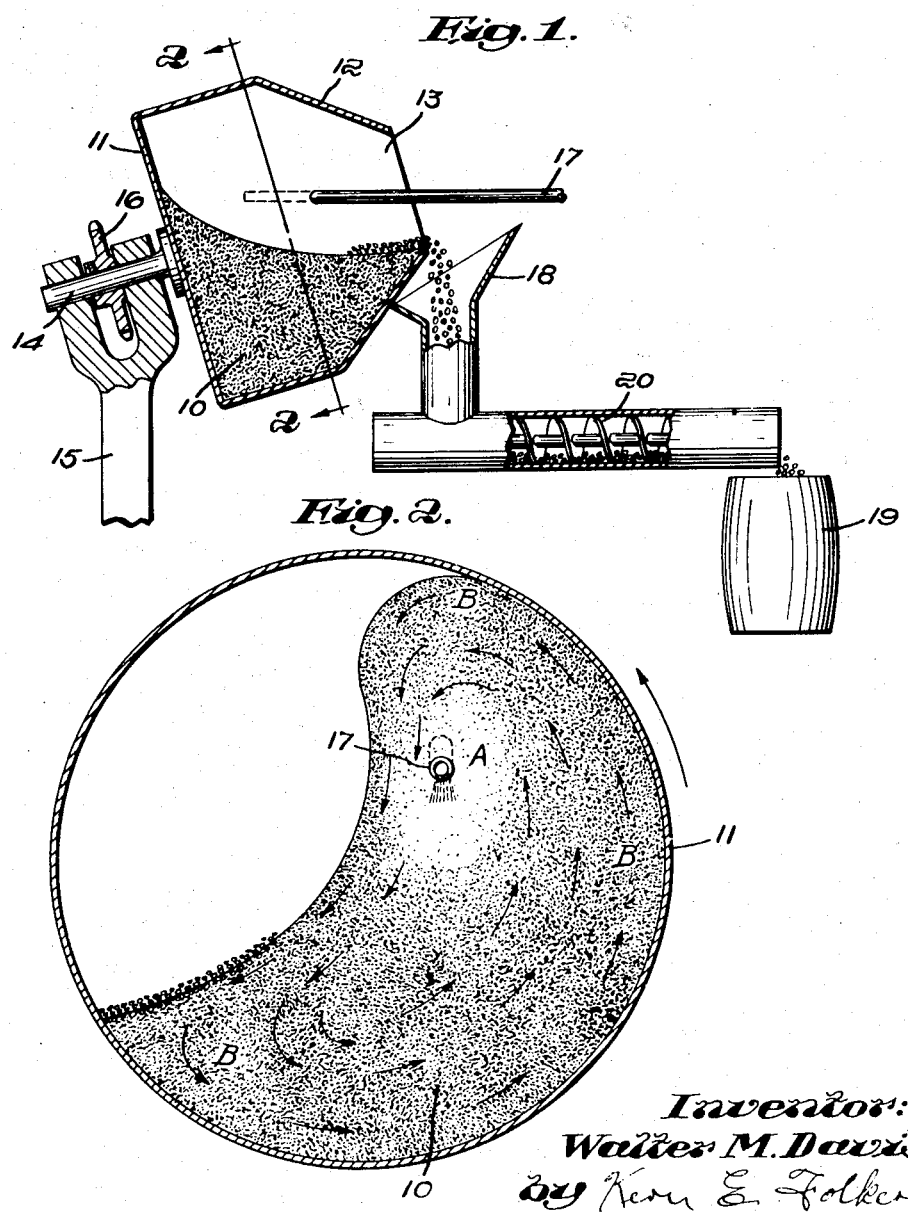
Inventor:
Walter M. Davis,
by Kern E. Folken
Attorney Patented Feb. 24, 1948

2,436,766

UNITED STATES PATENT OFFICE 2,436,766

METHOD OF MAKING PELLETS

Walter M. Davis, Jamaica Plain, Mass., assignor to Monsanto Chemical Company, St. Louis, Mo., a corporation of Delaware Application July 19, 1943, Serial No. 495,385

6 Claims. (Cl. 23—313)

1

This invention relates to the pelleting of finely divided solid substances, and particularly to the manufacture of pellets of phthalic anhydride and substances of similar properties.

In the past it has been common to form pellets of finely divided solid materials by feeding into a rotating drum or cylinder the solid material to be pelleted and a liquid, which can be either water or a solution of or a molten mass of the substance being treated. The solids and liquids supplied to the drum were usually fed in at a point above the rotating mass, and as a result the material adjacent the liquid feed tended to agglomerate and stick to the walls of the drum in the form of a more or less plastic mass, thereby markedly reducing the efficiency of the operation. The pellets produced in this manner are also usually quite voluminous and bulky with the result that it was not possible to pack as large a quantity of the material in the shipping containers as was desired. Also they are usually quite friable and rough surfaced which tends to produce dust during handling.

In an application of Ralph S. Hood, Serial No. 495,384, filed simultaneously herewith there are described and claimed improved methods of pelleting which avoid undue agglomeration or sticking of the solids to the walls of the pelleting apparatus and which result in smooth and relatively hard pellets which do not tend appreciably to form dust. The methods described in said application involve essentially mixing the finely divided solid to be pelleted with a liquid in a pelleting drum which rotates about a substantially horizontal axis or one not inclined more than about 30° from the horizontal. The mixing is carried out in such a manner that the mass in the drum rides up the upmoving side wall of the drum and falls over inwardly in such a way as to provide a relatively hollow region or region of low concentration, in which the particles are sparsely arranged and in which the circulation of the particles is partially restricted. The liquid employed in the pelleting process is then fed continuously into this relatively hollow or sparsely filled region with the above advantageous effects.

The present invention is an improvement on the methods of Hood outlined above, and has for its primary object the manufacture of smooth-surfaced pellets of phthalic anhydride or the like, which are exceptionally hard and dense and essentially crystalline in structure.

A further object of the invention is to produce continuously pellets of the type described without the necessity of using seed material, once the process has been started.

Further objects and advantages of the invention will appear from the following description and appended claims when considered in connection with the accompanying drawings, in which Fig. 1 is a diagrammatic view, partly in section, of a pelleting apparatus which is suitable for the purposes of this invention.

Fig. 2 is a sectional view of the pelleting drum or cylinder taken on the line 2—2 of Fig. 1.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention is carried out in general by proceeding at the start in accordance with the methods described in the above-mentioned Hood application, but keeping the temperature of the material in the relatively hollow or sparsely filled region within a predetermined range, which results in the production of pellets of unusual characteristics and avoids the necessity of continuously adding fine particles or seed once the process has been initiated. Thus, using phthalic anhydride as an example, an initial bed of finely divided anhydride, such as the bed 10 shown in the drawings, is supplied to the rotary drum or cylinder 11, after which the drum is rotated at such a speed that the material is carried up the side of the drum almost to the top, whereupon it falls in such a way as to produce a waterfall effect. As previously described, this operation is carried out in such a manner as to produce a relatively hollow region or a region A of low concentration (see Fig. 2), in which the particles are sparsely arranged and in which the circulation of the particles is partially restricted, that is, in which the particles remain during the greater portion of the actual pellet formation before moving into the outer, faster moving region B of the mass. Molten phthalic anhydride is then supplied to the drum by feeding it substantially into the relatively hollow or partially restricted region referred to above. If the rate of feed of the molten anhydride is properly adjusted, a relatively plastic zone is formed, in which the solid particles are coated with the molten material and form pellets without contacting the walls of the drum. Thus, caking of the material on the drum walls is avoided and the efficiency of the operation is greatly increased. Moreover, by forming the pellets in a relatively plastic zone, much smoother and stronger pellets are formed which are also substantially dust free.

By maintaining the temperature of the region A referred to above between about 100° C. and the melting point (131° C.), it is possible to produce discrete pellets of phthalic anhydride which are non-porous and essentially spherical, and consist of a multiplicity of superimposed crystalline layers. The resulting pellets are exceptionally dense, usually having an apparent density of at least 0.8, and possess a relatively hard and smooth surface, for which reason they are substantially dustless. By maintaining the above mentioned temperature conditions in the zone A of the pelleting drum, it is also possible to carry out the process continuously without the necessity of adding additional fine solids or seed, once the operation has begun. Thus, by maintaining temperatures within the specified limits small crystalline particles are formed in situ, which form the nucleus for additional pellets, as the initial fines or solids are consumed. This crystal formation may be the result of a subliming action, but regardless of its cause it results in the production of sufficient fine particles or seed for the process to proceed continuously.

In order to maintain the zone A at the desired temperature, it is necessary to cool the rotating mass in the drum. This can be accomplished either by externally cooling the drum as by spraying it with water, or by separating a portion of the pellets discharged from the drum, cooling the same and returning them to the drum. The amount of cooling required depends on the temperature of the molten anhydride supplied, and its rate of feed. In general, it is preferable to keep the temperature of the liquid feed just above its solidifying point, as this permits maximum production, with a given amount of cooling. It is possible however to add the molten material at any temperature between its solidifying and boiling points, the amount of cooling being adjusted accordingly.

A further understanding of the invention will be obtained from a description of the accompanying drawings and the operation of the apparatus shown therein. Referring to Fig. 1, the numeral 11 represents a rotary drum of the type which is closed at one end and terminates at its other end in a frustrated cone 12 having an opening 13 of sufficient size to permit the feeding of the materials to be treated and the egress of the pellets resulting from the rotation of the drum. Drum 11 is supported at its closed end by the rotary shaft 14, which in turn is supported by the U-shaped bracket or other suitable support 15. Rotation is obtained by means of the sprocket 16 and any suitable source of power (not shown). The finely divided phthalic anhydride to be pelleted initially is fed into the drum in any suitable manner, as by shoveling, or a hopper and screw conveyor may be used, if desired. The molten anhydride, on the other hand, is supplied by means of the pipe 17 from any suitable source of supply (not shown). The pellets formed as a result of the mixing and rotating action of the drum gradually spill over into the hopper 18, and are delivered as finished product to the barrel or other suitable receptacle 19 by means of the screw conveyor 20.

The apparatus described above may be operated, by way of example, in the following manner. One hundred and fifty pounds of phthalic anhydride seed, either in the form of powder or small pellets, are fed into the drum 11, this being sufficient to fill the drum about half full. This initial bed 10 of finely divided anhydride is then rotated in the drum at 16 revolutions per minute, which is fast enough to cause the anhydride to ride up the upmoving sidewall of the drum and fall over inwardly, much in the manner of a waterfall. By rotating the material in this manner a relatively hollow or sparsely filled region A of partially restricted movement (see Fig. 2) is formed in the rotating mass. Molten phthalic anhydride is then supplied to drum 11 at the rate of 400 to 500 pounds per hour by means of pipe 17, which is inserted into the rotating mass of solids at about the middle of the region A. By proceeding in this way, it is possible to maintain the pipe 17 in a predetermined position without the rotating mass tending to move it or snap it off its supports. Moreover, the molten material is fed to a slow moving or partially restricted region, in which the particles remain, more or less as in an eddy current, during a large part of the pelleting operation before moving into the outer faster moving region B of the mass. This permits the mass to become plastic and to form the pellets slowly with the result that they are harder and smoother than pellets formed in ordinary pelleting operations.

By proceeding in the above manner, large irregular clusters are formed at first, but as the temperature of the zone A approaches 80 to 100° C. relatively round or spherical pellets are formed. When the temperature in zone A reaches 110° C., cooling water is sprayed on the outside of the drum and the rate of liquid feed is adjusted in such a way as to produce a temperature of 118° C. in zone A, which is maintained in order to obtain pellets of substantially uniform size. If smaller pellets are desired, the temperature is raised by increasing the liquid feed and/or reducing the amount of cooling water. Likewise, larger pellets may be obtained by maintaining a lower temperature, but in any case the temperature in zone A should be maintained between about 100 and 130° C., as this results in exceptionally hard, dense and smooth pellets consisting of a plurality of crystalline layers and permits the process to be carried out without continuously adding new fines or grinding and recirculating some of the pellets previously formed.

The pellets formed in accordance with the above process have an exceptionally hard and smooth surface, and are generally crystalline in structure, being found to consist of a plurality of superimposed crystalline layers. Moreover, the pellets are unusually dense, having an apparent density varying between 0.8 and 0.9 or higher, depending upon the mesh size of the particles.

As indicated above control of the temperature in zone A of the rotating mass is obtained by externally cooling the drum and regulating the speed of flow of the hot molten phthalic anhydride. The temperature may be controlled in other ways, however, as for example, by externally cooling the pellets which pour out of the drum, separating a portion of the same, and returning the separated portion to the drum. Moreover, if desired, all three or any combination of these methods may be used to obtain the desired cooling or temperature.

When cooling is obtained by recirculation of the pellets, any suitable arrangement may be used for this purpose, such as the interconnecting screw conveyors and pipes described in the above-mentioned application of Ralph S. Hood. Sufficient cooling is sometimes obtained in such instances merely as the result of heat radiation. If necessary, however, the conveyors may be externally cooled in any suitable manner. As sufficient fines are formed in the drum itself in the course of the process described herein, it is not necessary to grind the pellets which are returned to the drum for cooling purposes.

Although the drum shown in the drawings is of the type which is closed at one end, it is possible to use any suitable drum or cylinder having a restricted opening at one or both ends and arranged to rotate on a horizontal or substantially horizontal axis. In general, it is preferable to tilt the drum somewhat from the horizontal, usually not higher than about 30°, as this increases the capacity of the drum and permits an improved classification of the pellets. Thus, by adjusting the angle of inclination of the drum axis, it is possible to remove selectively from the drum primarily the larger pellets being formed. This also prevents the formation of excessively large pellets which otherwise tend to remain in the drum and interfere with efficient operation of the apparatus. The use of drums having a cone-shaped end construction is also preferred, as this further facilitates the egress of the pellets from the drum and the selective removal of pellets of a relatively uniform size range. It should be understood, however, that the primary objects of the invention are obtained either with or without tilting the drum or using a cone-shaped end construction.

In general, the solid particles of pellets initially added to the drum are added in amounts sufficient to fill the drum from one quarter to one half full, but larger or smaller amounts may be used if desired, provided that a sufficient amount is added to produce the waterfall effect and the region of restricted circulation previously referred to.

The methods of this invention have been described as applicable primarily to the treatment of phthalic anhydride. They may also be used, however, for the pelleting of other similar substances, such as maleic anhydride, naphthalene, para dichlorobenzene, phenol and other substances having a sharp crystallizing point. In general, in order to obtain the desired results in pelleting these other substances, the temperature of the zone A of the mass being treated should be maintained close to the melting point, and in most instances not more than about 30° C. below the melting point.

Where reference is made herein and in the appended claims to finely divided solids or to substances in finely divided form, it is to be understood that this has reference to either a powdered material or to particles of larger size which are nevertheless smaller than the pellets it is desired to produce.

I claim:

1. The method of continuously forming pellets of phthalic anhydride and like substances having a sharp crystallizing point which comprises initially supplying a predetermined quantity of said substance in finely divided form to a rotary drum of the type which rotates about an axis not inclined more than about 30° from the horizontal, continuously rotating said drum at such speed that the mass of solids rides up the up-moving sidewall of the drum to the upper portion thereof and falls over inwardly, thereby forming in the central portion of the tumbling mass a region of relatively low particle concentration and relatively restricted circulation containing primarily the relatively lighter and finer particles in the mass, and continuously feeding an additional quantity of said substance in molten form to said drum at a point within said region and at such a rate as to provide a relatively plastic zone within the mass without supplying additional finely divided solid particles, said finer particles being coated with said molten material and formed into pellets while circulating in said zone and before appreciably commingling with the heavier and coarser particles in the outer faster moving portions of the mass, said zone being maintained at a temperature below the melting point but not more than about 30° C. below the melting point of said substance, whereby relatively hard, dense and smooth-surfaced pellets of crystalline structure are formed from said coated particles and additional crystalline fines are created out of said molten material forming the nuclei for additional pellets.

2. The method substantially as described in claim 1, but further characterized in that the drum is tilted from the horizontal along its axis of rotation with the mouth of the drum opening upwardly in such a manner as to favor the egress of the larger particles in the drum.

3. The method substantially as described in claim 1, but further characterized in that the temperature in said zone is maintained below the melting point but not more than about 30° C. below the melting point of said substance by externally cooling the drum during the formation of the pellets.

4. The method substantially as described in claim 1, but further characterized in that the temperature in said zone is maintained below the melting point but not more than about 30° C. below the melting point of said substance by externally cooling the pellets flowing out of said drum, separating a portion of the same and returning them to the drum.

5. The method substantially as described in claim 1, but further characterized in that the material being formed into pellets is phthalic anhydride and is maintained in said zone at a temperature between about 100 and 130° C.

6. The method substantially as described in claim 1, but further characterized in that the material being formed into pellets is phthalic anhydride and is fed in molten form into said region of low particle concentration until the mass in said region has reached a temperature of about 110° C., after which a temperature of about 118° C. is maintained in said region by adjusting the rate of feed of said molten material and simultaneously cooling said drum.

WALTER M. DAVIS.

REFERENCES CITED

The following references are of record in the file of this patent:

UNITED STATES PATENTS

| Number | Name | Date |
|---|---|---|
| 1,480,561 | McNeil | Jan. 15, 1924 |
| 1,837,869 | Jewett | Dec. 22, 1931 |
| 1,853,818 | Kobbe | Apr. 12, 1932 |
| 2,340,567 | Sargent | Feb. 1, 1944 |
| 1,911,761 | Loomis | May 30, 1933 |
| 1,239,221 | Rodman | Sept. 4, 1917 |
| 1,891,754 | Daniels | Dec. 20, 1932 |